United States Patent
Ram et al.

(10) Patent No.: US 10,395,378 B2
(45) Date of Patent: Aug. 27, 2019

(54) DETECTING PERIODIC PATTERNS AND APERTURE PROBLEMS FOR MOTION ESTIMATION

(71) Applicant: SAMSUNG ELECTRONICS CO., LTD., Suwon-si, Gyeonggi-Do (KR)

(72) Inventors: Idan Ram, Kfar Saba (IL); Omry Sendik, Givatayim (IL)

(73) Assignee: SAMSUNG ELECTRONICS CO., LTD., Suwon-si, Gyeonggi-Do (*) Notice: Subject to any disclaimer, the term of this patent is extended or adjusted under 35 U.S.C. 154(b) by 51 days.

(21) Appl. No.: 15/647,118

(22) Filed: Jul. 11, 2017

(65) Prior Publication Data

US 2018/0018777 A1    Jan. 18, 2018

Related U.S. Application Data

(60) Provisional application No. 62/362,755, filed on Jul. 15, 2016.

(51) Int. Cl.
   - G06T 7/246 (2017.01)
   - G06T 7/254 (2017.01)
   - G06T 7/262 (2017.01)

(52) U.S. Cl.
   CPC ........... G06T 7/248 (2017.01); G06T 7/251 (2017.01); G06T 7/254 (2017.01); G06T 7/262 (2017.01); *G06T 2207/10016* (2013.01); *G06T 2207/20021* (2013.01); *G06T 2207/20061* (2013.01); *G06T 2207/20076* (2013.01); *G06T 2207/20081* (2013.01)

(58) Field of Classification Search
   CPC ......... G06T 7/248; G06T 7/251; G06T 7/254; G06T 7/262; G06T 2207/10016; G06T 2207/20021; G06T 2207/20061; G06T 2207/20076; G06T 2207/20081
   See application file for complete search history.

(56) References Cited

U.S. PATENT DOCUMENTS

| | | | | |
|---|---|---|---|---|
| 5,793,430 A | * | 8/1998 | Hackett | H04N 5/145 348/416.1 |
| 7,406,212 B2 | * | 7/2008 | Mohamed | G06K 9/4633 382/248 |
| 7,693,218 B2 | * | 4/2010 | Hubrich | H04N 5/145 375/240.16 |

(Continued)

*Primary Examiner* — Katrina R Fujita
(74) *Attorney, Agent, or Firm* — F. Chau & Associates, LLC

(57) ABSTRACT

A method of evaluating motion estimation between a pair of digitized images includes receiving a distance map between a source block in a source image and all the blocks in a search area in a target image, scanning each column of the distance map, and saving indices of a minimum distance value for each column, scanning each row of the distance map, and saving indices of a minimum distance value for each row, locating candidate lines that pass through at least some local minima points that correspond to locations in the distance map of the minimum distance value in each of the columns or the minimum distance value in each of the rows determining a confidence level for each candidate line that passes through at least some of the local minima points, and selecting those candidate lines whose confidence level is greater than a predetermined threshold value.

12 Claims, 9 Drawing Sheets

(56) References Cited

U.S. PATENT DOCUMENTS

| | | | |
|---|---|---|---|
| 8,184,696 B1* | 5/2012 | Chirila-Rus | H04N 19/433 375/240.02 |
| 2009/0103773 A1* | 4/2009 | Wheeler | G01S 7/4802 382/100 |
| 2012/0078894 A1* | 3/2012 | Jiang | G06F 17/30743 707/723 |
| 2013/0039427 A1* | 2/2013 | Namboodiri | H04N 19/56 375/240.16 |
| 2017/0148140 A1* | 5/2017 | Bellert | G06K 9/00463 |

* cited by examiner

FIG. 10A
FIG. 10B
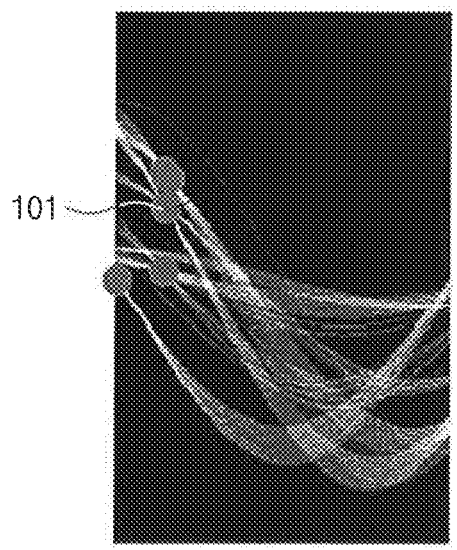
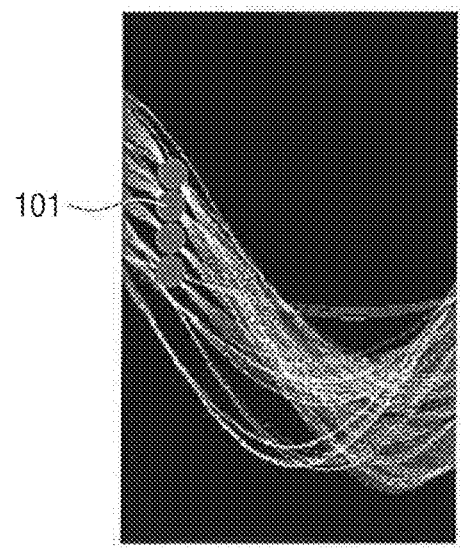

FIG. 13A
FIG. 13B
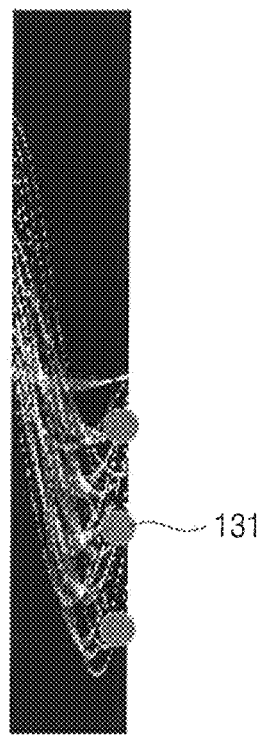
(a)
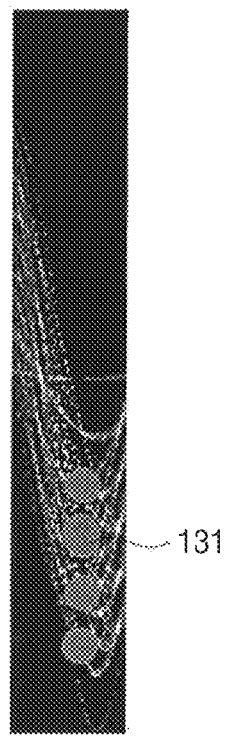
(b)

DETECTING PERIODIC PATTERNS AND APERTURE PROBLEMS FOR MOTION ESTIMATION

CROSS-REFERENCE TO RELATED APPLICATIONS

This application claims priority under 35 U.S.C. § 119 from U.S. Provisional Patent Application No. 62/362,755 filed on Jul. 15, 2016 the contents of which are herein incorporated by reference in their entirety.

BACKGROUND

1. Technical Field

Embodiments of the present disclosure are directed to computer vision and image processing. More particularly, embodiments of the present disclosure are directed to the detection of periodic patterns and aperture problems when performing motion estimation using digital images.

2. Discussion of the Related Art

Algorithms that perform pattern matching in digital images, such as motion estimation, disparity calculation, denoising, etc., often require the usage of a distance measure. Under typical physical variations, such as noise, motion, misalignments, etc., naïve pattern matching approaches often fail to correctly match patterns. Two of the typical causes of failure are periodic patterns and aperture problems, which can cause the final match to fall on one of similar random patterns.

SUMMARY

Embodiments of the present disclosure are directed to systems and methods for detecting the existence of periodic patterns and aperture problems in digital images.

According to an embodiment of the disclosure, there is provided a method of evaluating motion estimation between a pair of digitized images, including receiving from a motion estimation algorithm a distance map between a source block in a source image and all the blocks in an M×N search area in a target image, where the distance map is an M×N matrix of distance values, where M and N are positive non-zero integers, scanning each column of the distance map, and saving indices of a minimum distance value for each column, scanning each row of the distance map, and saving indices of a minimum distance value for each row, locating candidate lines that pass through at least some local minima points that correspond to locations in the distance map of the minimum distance value in each of the columns or the minimum distance value in each of the rows, determining a confidence level for each candidate line that passes through at least some of the local minima points, and selecting those candidate lines whose confidence level is greater than a predetermined threshold value.

According to a further embodiment of the disclosure, the distance map is determined using a distance measure selected from one of a sum of absolute differences or a normalized cross correlation between the source block and each of the target blocks.

According to a further embodiment of the disclosure, locating candidate lines that pass through at least some local minima points comprises using a Hough transform to locate the candidate lines, where each point in a Hough transform domain is an intersections of K curves, which correspond to a line passing through K points in the image domain, where K is a positive integer greater than zero.

According to a further embodiment of the disclosure, a confidence level for each candidate line is determined from a number of curves passing through a point in the Hough transform domain.

According to a further embodiment of the disclosure, locating candidate lines that pass through at least some local minima points comprises using a RANSAC algorithm to locate the candidate lines, comprising randomly selecting a pair of local minima points, calculating a line through the selected points and evaluating a number of local minima points within a threshold distance from the line, repeating for a predetermined number of steps of randomly selecting a pair of local minima points and calculating a line through the selected points and evaluating a number of local minima points within a threshold distance from the line, and selecting a line with a greatest number of local minima points within the threshold distance from the line.

According to a further embodiment of the disclosure, a confidence level for each candidate line is a number of minima points within the threshold distance from the line.

According to another embodiment of the disclosure, there is provided a program storage device readable by a computer, tangibly embodying a program of instructions executable by the computer to perform the method steps for evaluating motion estimation between a pair of digitized images.

BRIEF DESCRIPTION OF THE DRAWINGS

FIGS. 10A and 10B illustrates obtained lines, according to an embodiment of the disclosure.

FIGS. 13A and 13B illustrates obtained lines for a periodic pattern case, according to an embodiment of the disclosure.

DETAILED DESCRIPTION OF EXEMPLARY EMBODIMENTS

Figure 1:
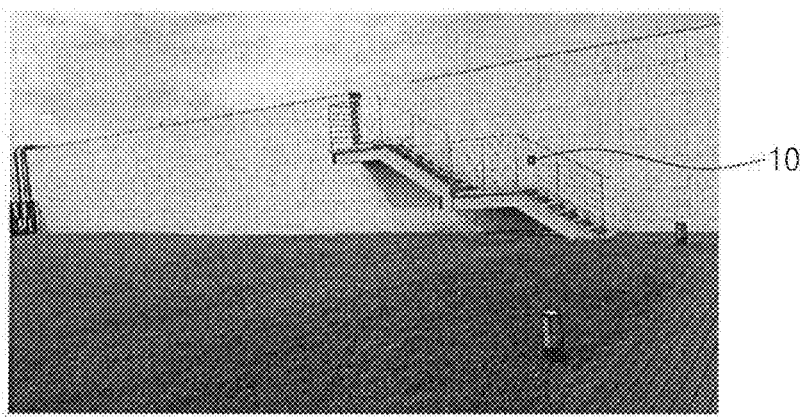
FIG. 1 illustrates motion estimation for a source image, according to an embodiment of the disclosure.

Exemplary embodiments of the disclosure as described herein generally provide systems and methods for detecting the existence of periodic patterns and aperture problems in digital images. While embodiments are susceptible to various modifications and alternative forms, specific embodiments thereof are shown by way of example in the drawings and will herein be described in detail. It should be understood, however, that there is no intent to limit the disclosure to the particular forms disclosed, but on the contrary, the disclosure is to cover all modifications, equivalents, and alternatives falling within the spirit and scope of the disclosure.

As used herein, the term "image" refers to multi-dimensional data composed of discrete image elements (e.g., pixels for 2-dimensional images and voxels for 3-dimensional images). The image may be, for example, an image of a subject collected by any imaging system known to one of skill in the art. Although an image can be thought of as a function from $R^3$ to R, methods of the disclosure are not limited to such images, and can be applied to images of any dimension, e.g., a 2-dimensional picture or a 3-dimensional volume. For a 2- or 3-dimensional image, the domain of the image is typically a 2- or 3-dimensional rectangular array, wherein each pixel or voxel can be addressed with reference to a set of 2 or 3 mutually orthogonal axes. The terms "digital" and "digitized" as used herein will refer to images or volumes, as appropriate, in a digital or digitized format acquired via a digital acquisition system or via conversion from an analog image.

Embodiments of the present disclosure use a distance map obtained from a motion estimation block. A distance map is a matrix of distance values. Lines are searched in this map to detect whether this map was evaluated on areas of the image containing periodic patterns or suffering from aperture problems.

Motion estimation algorithms calculate motion vectors, which define the motion of blocks, from their original location in a source image to their new location in a target image, wherein a block is a cluster of one or more pixels. To estimate such motion vectors, a distance measure, such as a sum of absolute distances (SAD) or normalized cross correlation (NCC), is chosen, and then for each block in the source image, the distance between this block and all the blocks in an M×N search area in the target image are evaluated, where M and N are positive non-zero integers. This results in an M×N matrix containing distance values, which is referred to as a distance map. The motion vector is selected as the vector starting from the center of the block in the source image and ending in the center of the block in the target image corresponding to the minimum value in the distance map. An example of a block 10 in a source image, the corresponding search area 20 in the target image, and a resulting SAD distance map are respectively shown in FIGS. 1, 2 and 3.

While simple in concept and effective in many cases, a pattern matching approach as described above often fails when it encounters two scenarios: aperture problems and the existence of periodic patterns in the source and target images.

An aperture problem exists when a desired target block is indistinct from its neighboring blocks, which makes it challenging for the motion estimation scheme to choose the correct block. This happens, for example, when a source block is located on an edge or a smooth surface. An example of a block suffering from an aperture problem is block 10 in FIG. 1.

Figure 4:
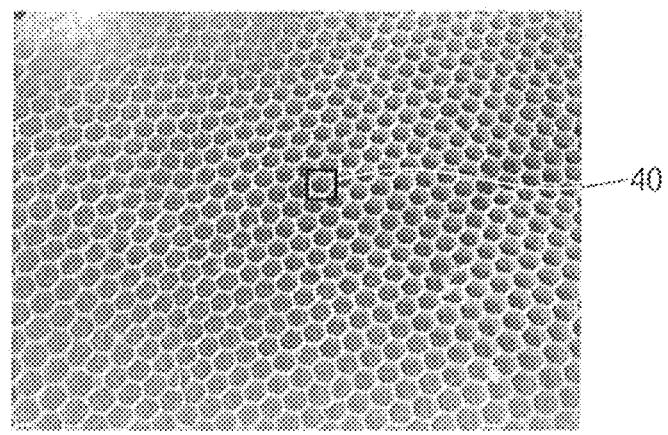
FIG. 4 illustrates a motion estimation source image containing a periodic pattern, according to an embodiment of the disclosure.
Figure 6:
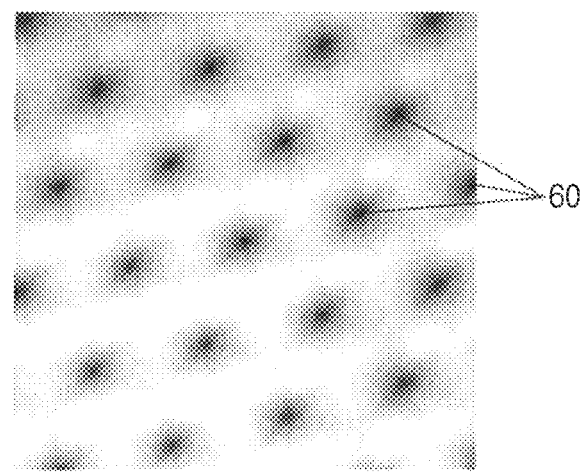
FIG. 6 illustrates a distance map obtained from images containing periodic patterns, according to an embodiment of the disclosure.

Similarly, when periodic patterns exist in the source and target images, other blocks beside the desired target block may resemble the source block. FIG. 4 shows an example of a block 40 in a source image containing periodic patterns is a honeycomb, FIG. 4 shows a corresponding search area 50 in a target image, and FIG. 6 shows the resulting SAD distance map.

Embodiments of the disclosure can detect both aperture problems and periodic patterns by locating local minima points, which appear as darker pixels, in the distance maps, and finding lines which pass through the minima points. Referring to the distance map in FIG. 3, which corresponds to blocks suffering from aperture problems, lines can be seen in this matrix. Similarly, while lines do not explicitly appear in the distance matrix in FIG. 6, periodic dark spots 60, which correspond to local minima, can be seen on straight lines. Note that for clarity, only some of the dark spots 60 are indicated in FIG. 6.

According to an embodiment of the disclosure, these lines can be searched using the following procedure: first, scan the distance map rows and save the indices of the minimal distances along columns. Next scan the distance matrix columns and save the indices of the minimal distances along rows. For a distance map with M rows and N columns, there are M+N pairs of indices.

Figure 3:
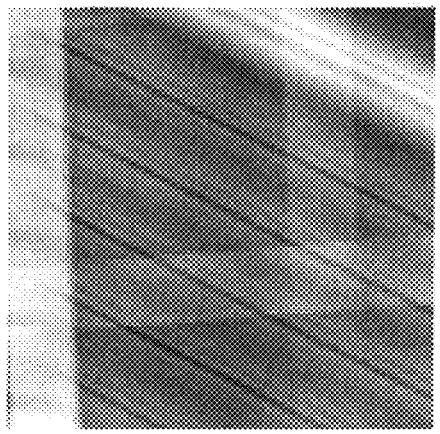
FIG. 3 illustrates a distance map obtained from the source image and target image of FIGS. 1 and 2, respectively, according to an embodiment of the disclosure.
Figure 7:
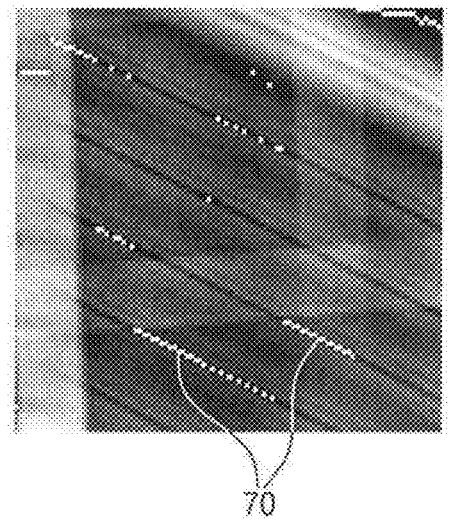
FIG. 7 illustrates minima along columns, according to an embodiment of the disclosure.
Figure 8:
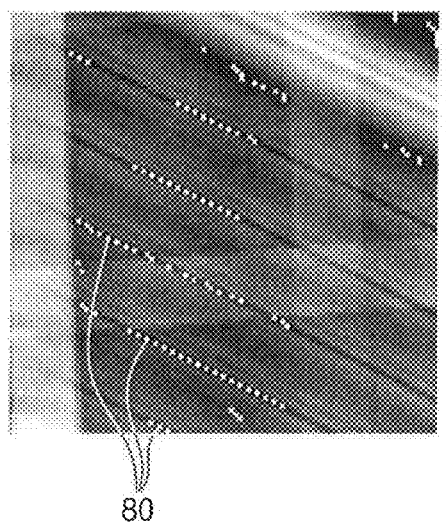
FIG. 8 illustrates minima along rows, according to an embodiment of the disclosure.

FIGS. 7 and 8 show white pixels 70, 80 that indicate the location of minimal distances along columns and rows, respectively, found from the distance matrix shown in FIG. 3. Again, for clarity, only some of the white spots 70, 80 are indicated in FIGS. 7 and 8.

According to embodiments of the disclosure, these indices can be used to determine if the local minima points are located on lines. Line detection can be performed in multiple ways and embodiments of the disclosure are not limited to a specific method. A final step according to an embodiment is to threshold the line detection. Any line detection score above a preset threshold will indicate the presence of a line which indicates an aperture problem or a periodic pattern.

Figure 9:
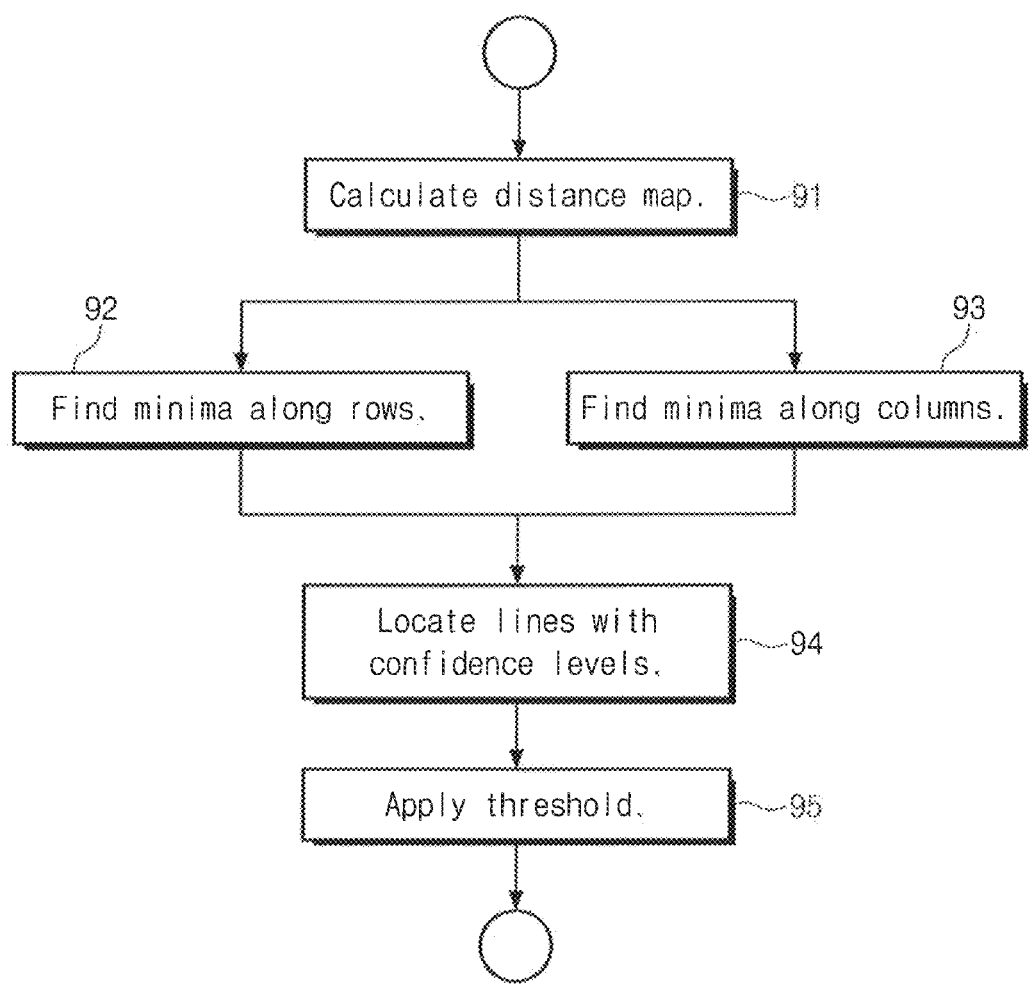
FIG. 9 is a flowchart of a method of motion estimation, according to an embodiment of the disclosure.

FIG. 9 is a flow chart of an algorithm according to an embodiment of the disclosure for detecting, periodic patterns and aperture problems when performing motion estimation, which outputs a distance map. A distance map is derived at step 91 from a source image and a target image, and steps 92 and 93 respectively search for indices of local minima long the rows and columns of this map. For a distance map with M rows and N columns, there are M+N pairs of indices. The distance map is a matrix of distance values. The indices of the minimum distance value in each row and of the minimum distance value in each row are used to locate lines in the distance map at step 94, with corresponding confidence levels. A detector value is obtained at step 95 by applying a predetermined threshold to these confidence values.

Figure 2:
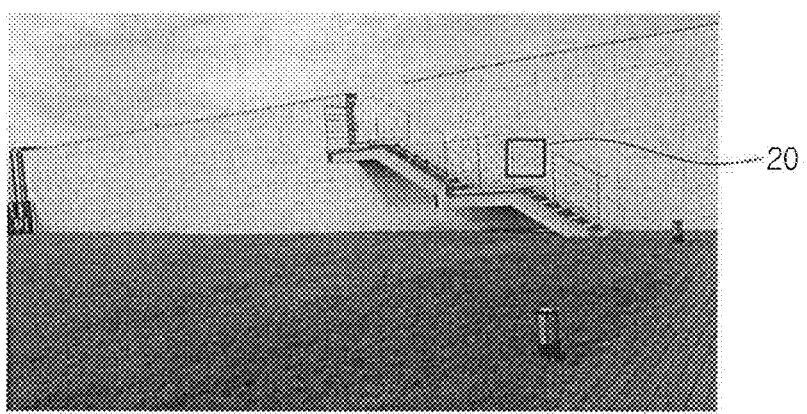
FIG. 2 illustrates motion estimation target image, according to an embodiment of the disclosure.

An algorithm according to an embodiment of the disclosure can detect aperture problems in the two images shown in FIGS. 1 and 2. A Hough transform can be used to locate lines passing through the minimal SAD values 70 and 80 highlighted in FIGS. 7 and 8, and a threshold is applied to the obtained values. FIGS. 10A and 10B show the Hough transforms results obtained for FIGS. 7 and 8, respectively, where points 101 correspond to lines that passed the threshold. The Hough transform locates straight lines using the following parametric representation of a line: $p=x\times\cos(\theta)$ $y\times\sin(\theta)$. As a result, a point in the image pixel plane is represented as a curve in the Hough transform domain shown in FIG. 10, where the axes are ρ and θ. Each point 101 in the Hough transform domain is an intersection of K curves, which correspond to a line passing through K points in the image domain. The larger the number of curves intersecting in a point in the Hough transform domain, the more points the detected line passes through in the image plane, and the higher is the confidence in it. More specifically, a confidence level according to an embodiment is determined by the number of curves passing through a point in the Hough transform domain, and therefore counters are used to obtain these numbers for each point. According to embodiments, only counter values above a certain threshold, are considered as line candidates. It can be seen that 5 lines were detected in FIGS. 7 and 4 lines in FIG. 8, i.e. the detector indeed located lines in the distance map when an aperture problem existed. Again, for clarity, only some of the points 101 are indicated in FIGS. 10A and 10B.

According to further embodiment of the disclosure, another method for detecting lines it to use line model fitting with the RANSAC algorithm. This is an iterative method, applied for a pre-defined number of iterations. In each iteration a pair of points is randomly chosen, the line passing through them is calculated, and the number of points close to this line, within a threshold, is evaluated. The larger the number of points close to a line, the more confident there is in this line, and only lines with number of close points above a certain threshold are considered as line candidates.

Figure 5:
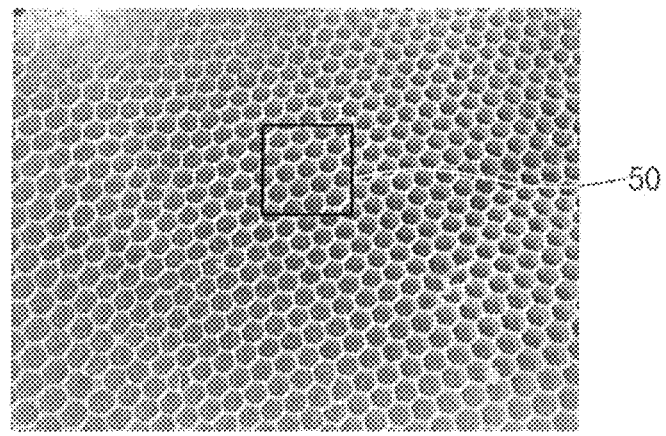
FIG. 5 illustrates a motion estimation target image containing a periodic pattern, according to an embodiment of the disclosure.
Figure 11:
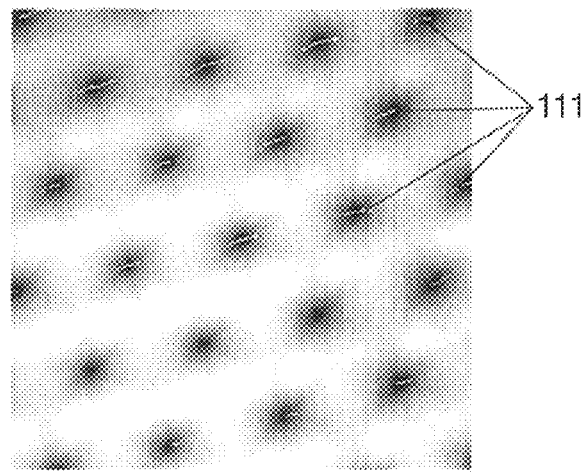
FIG. 11 illustrates minima along columns for a periodic pattern case, according to an embodiment of the disclosure.
Figure 12:
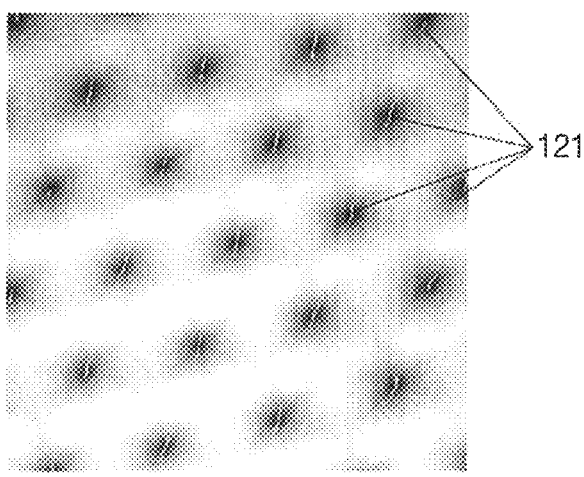
FIG. 12 illustrates minima along rows for a periodic pattern case, according to an embodiment of the disclosure.

An algorithm according to an embodiment of the disclosure can detect periodic patterns in the two images shown in FIGS. 4 and 5. The distance map can be scanned to find the minimal distances along columns and rows, shown in FIGS. 11 and 12, respectively. In a distance map, low values appear as dark pixels and high values appear as bright pixels, thus the minimal distances in FIGS. 11 and 12 are represented as dark spots 111 and 121, where only some of the minimal distance spots are identified, for clarity.

A Hough transform or RANSAC algorithm is again used to locate lines passing through the minimal SAD values in these figures, and a threshold is applied to the obtained values. FIGS. 13A and 13B respectively show Hough transforms results obtained for FIGS. 11 and 12, where points 131 correspond to lines that passed the threshold. It can be seen that 3 lines were detected in FIGS. 11 and 5 lines in FIG. 12, i.e. the detector indeed located lines its a distance map that contained periodic patterns. Again, for clarity, only some of the points 131 are indicated in FIGS. 13A and 13B.

The existence of lines in the distance map suggests the existence of periodic patterns or aperture problem in the image. The more lines are detected and the higher the confidence levels of each line, the more confident there is in the existence of periodic patterns or aperture problems.

It is to be understood that embodiments of the present disclosure can be implemented in various forms of hardware, software, firmware, special purpose processes, or a combination thereof. In one embodiment, the present disclosure can be implemented in software as an application program tangible embodied on a computer readable program storage device. The application program can be uploaded to, and executed by, a machine comprising any suitable architecture.

Figure 14:
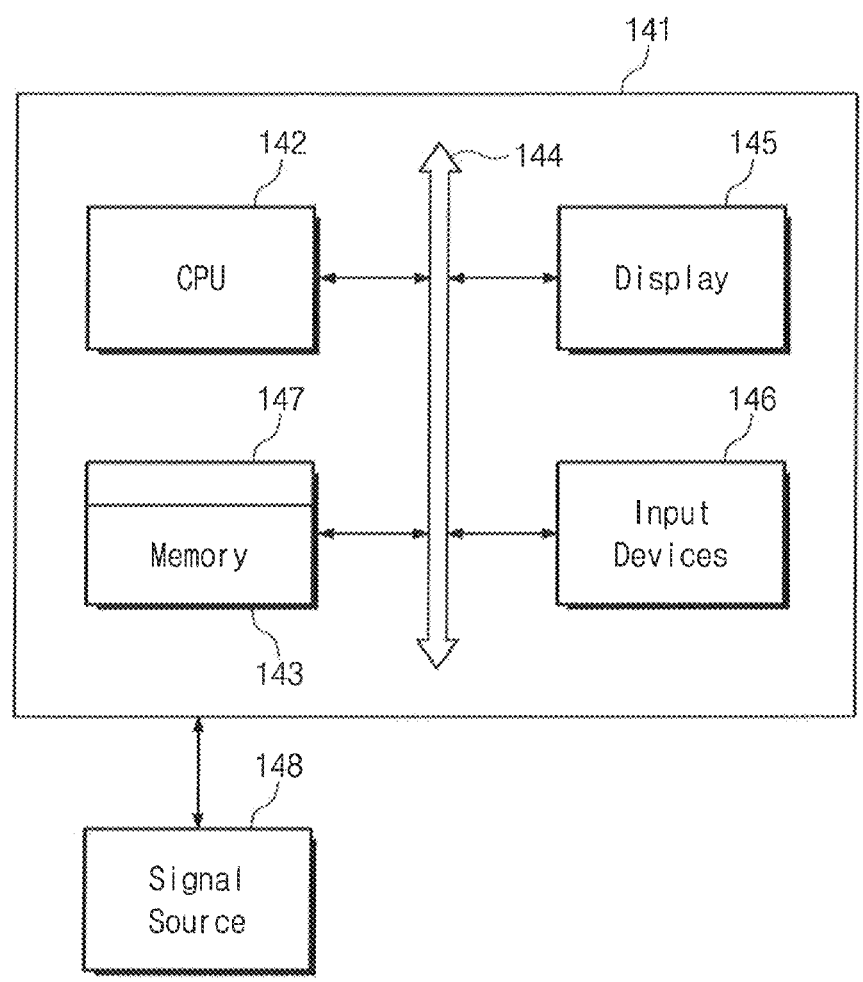
FIG. 14 is a block diagram of a system for implementing a method for detecting the existence of periodic patterns and aperture problems while performing motion estimation in digital images, according to an embodiment of the disclosure.

FIG. 14 is a block diagram of an exemplary computer system for implementing a method for detecting the existence of periodic patterns and aperture problems while performing motion estimation in digital images according to an embodiment of the disclosure. Referring now to FIG. 14, a computer system 141 for implementing the present disclosure can comprise, inter alia, a central processing unit (CPU) 142, a memory 143 and an input/output (I/O) interface 144. The computer system 141 is generally coupled through the I/O interface 144 to a display 145 and various input devices 146 such as a mouse and a keyboard. The support circuits can include circuits such as cache, power supplies, clock circuits, and a communication bus. The memory 143 can include random access memory (RAM), read only memory (ROM), disk drive, tape drive, etc., or a combinations thereof. The present disclosure can be implemented as a routine 147 that is stored in memory 143 and executed by the CPU 142 to process the signal from the signal source 148. As such, the computer system 141 is a general purpose computer system that becomes a specific purpose computer system when executing the routine 147 of the present disclosure.

The computer system 141 also includes an operating system and micro instruction code. The various processes and functions described herein can either be part of the micro instruction code or part of the application program (or combination thereof) which is executed via the operating system. In addition, various other peripheral devices can be connected to the computer platform such as an additional data storage device and a printing device.

It is to be further understood that, because some of the constituent system components and method steps depicted in the accompanying figures can be implemented in software, the actual connections between the systems components (or the process steps) may differ depending upon the manner in which the present disclosure is programmed. Given the teachings of the present disclosure provided herein, one of ordinary skill in the related art will be able to contemplate these and similar implementations or configurations of the present disclosure.

While embodiments of the present disclosure has been described in detail with reference to exemplary embodiments, those skilled in the art will appreciate that various modifications and substitutions can be made thereto without departing from the spirit and scope of the disclosure as set forth in the appended claims.

What is claimed is:

1. A method of evaluating motion estimation between a pair of digitized images, comprising the steps of:
   receiving from a motion estimation algorithm a distance map between a source block in a source image and all the blocks in an M×N search area in a target image, wherein the distance map is an M×N matrix of distance values, wherein M and N are positive non-zero integers;
   scanning each column of the distance map, and saving indices of a minimum distance value for each column;
   scanning each row of the distance map, and saving indices of a minimum distance value for each row;
   locating candidate lines that pass through at least some local minima points that correspond to locations in the distance map of the minimum distance value in each of the columns or the minimum distance value in each of the rows;
   determining a confidence level for each candidate line that passes through at least some of the local minima points; and
   selecting those candidate lines whose confidence level is greater than a predetermined threshold value.

2. The method of claim 1, wherein the distance map is determined using a distance measure selected from one of a sum of absolute differences or a normalized cross correlation between the source block and each of the target blocks.

3. The method of claim 1, wherein locating candidate lines that pass through at least some local minima points comprises using a Hough transform to locate the candidate lines, wherein each point in a Hough transform domain is an intersections of K curves, which correspond to a line passing through K points in the image domain, wherein K is a positive integer greater than zero.

4. The method of claim 3, wherein a confidence level for each candidate line is determined from a number of curves passing through a point in the Hough transform domain.

5. The method of claim 1, wherein locating candidate lines that pass through at least some local minima points comprises using a RANSAC algorithm to locate the candidate lines, comprising
    randomly selecting a pair of local minima points,
    calculating a line through the selected points and evaluating a number of local minima points within a threshold distance from said line,
    repeating for a predetermined number of steps of randomly selecting a pair of local minima points and calculating a line through the selected points and
    evaluating a number of local minima points within a threshold distance from said line, and selecting a line with a greatest number of local minima points within said threshold distance from said line.

6. The method of claim 5, wherein a confidence level for each candidate line is a number of minima points within the threshold distance from the line.

7. A non-transitory program storage device readable by a computer, tangibly embodying a program of instructions executable by the computer to perform the method steps for evaluating motion estimation between a pair of digitized images, the method comprising the steps of:
    receiving from a motion estimation algorithm a distance map between a source block in a source image and a all the blocks in an M×N search area in a target image, wherein the distance map is an M×N matrix of distance values, wherein M and N are positive non-zero integers;
    scanning each column of the distance map, and saving indices of a minimum distance value for each column;
    scanning each row of the distance map, and saving indices of a minimum distance value for each row;
    locating candidate lines that pass through at least some local minima points that correspond to locations in the distance map of the minimum distance value in each of the columns or the minimum distance value in each of the rows;
    determining a confidence level for each candidate line that passes through at least some of the local minima points; and
    selecting those candidate lines whose confidence level is greater than a predetermined threshold value.

8. The non-transitory computer readable program storage device of claim 7, wherein the distance map is determined using a distance measure selected from one of a sum of absolute differences or a normalized cross correlation between the source block and each of the target blocks.

9. The non-transitory computer readable program storage device of claim 7, wherein locating candidate lines that pass through at least some local minima points comprises using a Hough transform to locate the candidate lines, wherein each point in a Hough transform domain is an intersections of K curves, which correspond to a line passing through K points in the image domain, wherein K is a positive integer greater than zero.

10. The non-transitory computer readable program storage device of claim 9, wherein a confidence level for each candidate line is determined from a number of curves passing through a point in the Hough transform domain.

11. The non-transitory computer readable program storage device of claim 7, wherein locating candidate lines that pass through at least some local minima points comprises using a RANSAC algorithm to locate the candidate lines, comprising
    calculating a line through the selected points and evaluating a number of local minima points within a threshold distance from said line,
    repeating for a predetermined number of steps of randomly selecting a pair of local minima points and calculating a line through the selected points and evaluating a number of local minima points within a threshold distance from said line, and
    selecting a line with a greatest number of local minima points within said threshold distance from said line.

12. The non-transitory computer readable program storage device of claim 11, wherein a confidence level for each candidate line is a number of minima points within the threshold distance from the line.

\* \* \* \* \*